(12) United States Patent
Kim et al.

(10) Patent No.: US 10,847,764 B2
(45) Date of Patent: Nov. 24, 2020

(54) BATTERY PACK INCLUDING TRAY STOPPER FOR PREVENTING SPRING BACK OF PACK COVER

(71) Applicant: LG Chem, Ltd., Seoul (KR)

(72) Inventors: Tae-Hyuck Kim, Daejeon (KR); Yu-Na Kwon, Daejeon (KR); Sung-Gon Kim, Daejeon (KR); Tae-Hwan Roh, Daejeon (KR)

(73) Assignee: LG Chem, Ltd., Seoul (KR)

( * ) Notice: Subject to any disclaimer, the term of this patent is extended or adjusted under 35 U.S.C. 154(b) by 228 days.

(21) Appl. No.: 16/080,479

(22) PCT Filed: Oct. 11, 2017

(86) PCT No.: PCT/KR2017/011186
§ 371 (c)(1),
(2) Date: Aug. 28, 2018

(87) PCT Pub. No.: WO2018/084442
PCT Pub. Date: May 11, 2018

(65) Prior Publication Data
US 2020/0227704 A1    Jul. 16, 2020

(30) Foreign Application Priority Data
Nov. 4, 2016  (KR) .................. 10-2016-0146824

(51) Int. Cl.
*H01M 2/10* (2006.01)
*H01M 2/02* (2006.01)
(Continued)

(52) U.S. Cl.
CPC .............. *H01M 2/10* (2013.01); *B60L 50/64* (2019.02); *B60L 50/66* (2019.02);
(Continued)

(58) Field of Classification Search
None
See application file for complete search history.

(56) References Cited

U.S. PATENT DOCUMENTS 8,900,744 B2 * 12/2014 Loo ..................... H01M 2/1072
                                                         429/172
9,054,360 B2 *  6/2015 Yi ............................ B60K 1/04
2013/0108909 A1  5/2013 Matsuo et al.

FOREIGN PATENT DOCUMENTS

JP     2011-065908 A    3/2011
KR   10-1045862 B1      7/2011
(Continued)

OTHER PUBLICATIONS

Design technology series Next-generation automotive lithium-ion battery design method, Scientific Information Publishing Co., Ltd., Jan. 2013, first edition, pp. 30-31 (in Japanese language with English concise statement of relevance attached).

(Continued)

*Primary Examiner* — Tracy M Dove
(74) *Attorney, Agent, or Firm* — Morgan, Lewis & Bockius LLP (57) ABSTRACT

Disclosed is a battery pack, which includes at least one battery module and electric parts electrically connected to the at least one battery module, a tray configured to support the at least one battery module and the electric parts at an upper surface thereof, and a pack cover having a rim that faces a rim of the tray, the pack cover being coupled to the tray to cover the battery module and the electric parts, wherein the tray includes a tray stopper provided at the rim of the tray and bent upwards to support the rim of the pack cover from an outer side toward an inner side.

11 Claims, 10 Drawing Sheets (51) Int. Cl.
*B60L 50/64* (2019.01)
*B60L 50/60* (2019.01)

(52) U.S. Cl.
CPC ....... *H01M 2/0247* (2013.01); *H01M 2/1083* (2013.01); *H01M 2220/20* (2013.01)

(56) References Cited

FOREIGN PATENT DOCUMENTS

| | | |
|---|---|---|
| KR | 10-1069507 B1 | 9/2011 |
| KR | 10-2014-0110444 A | 9/2014 |
| KR | 10-2015-0086680 A | 7/2015 |
| KR | 10-1602319 B1 | 3/2016 |
| WO | 2011/153312 A2 | 12/2011 |
| WO | 2011/155559 A | 12/2011 |

OTHER PUBLICATIONS

International Search Report and Written Opinion for Application No. PCT/KR2017/011186, dated Feb. 2, 2018 (with partial English trans) (11 pages).

\* cited by examiner

BATTERY PACK INCLUDING TRAY STOPPER FOR PREVENTING SPRING BACK OF PACK COVER

TECHNICAL FIELD

The present application claims priority under 35 U.S.C. §119 to Korean Patent Application No. 10-2016-0146824 filed on Nov. 4, 2016 in the Republic of Korea, and under 35 U.S.C. §365 to PCT/KR2017/011186 filed on Oct. 11, 2017, the disclosures of which are incorporated herein by reference.

The present disclosure relates to a battery pack, and more particularly, to a battery pack having a tray stopper that functions to guide assembling of a tray and a pack cover of a battery pack casing.

BACKGROUND ART

In recent years, secondary batteries have been widely used not only in small-sized devices such as portable electronic devices but also in electric vehicles that require a driving force by using internal combustion engines and/or electric motors. The electric vehicle includes a hybrid electric vehicle, a plug-in hybrid vehicle, and an electric vehicle driven only by an electric motor and a battery without an internal combustion engine.

In the electric vehicle, a large number of secondary batteries are electrically connected to increase capacity and power. Especially, a pouch-type secondary battery is widely used because it is easy to stack pouch-type secondary batteries in medium-sized and large-sized devices.

Secondary batteries currently widely used include lithium ion batteries, lithium polymer batteries, nickel cadmium batteries, nickel hydrogen batteries, nickel-zinc batteries and the like. Such a unit secondary battery cell, namely a unit battery cell, has an operating voltage of about 2.5V to 4.2V. Thus, when a higher output voltage is required, a plurality of battery cells may be connected in series to form a battery pack. In addition, depending on the charging/discharging capacity required for the battery pack, a plurality of battery cells may be connected in parallel to form a battery pack. Thus, the number of battery cells included in the battery pack may be set variously depending on the required output voltage or charging/discharging capacity.

A conventional battery pack may generally include at least one battery module, electric parts required for operating the battery module and a pack casing for protecting these components from an external impact, and these components may be customized in various ways depending on vehicle structures and conditions. For example, in a middle-sized or large-sized battery pack, the pack casing may be composed of a tray having a relatively large area in the form of a plate and a pack cover having a rim coupled to a rim of the tray to form a space for accommodating the battery module therein.

Meanwhile, in the case of a middle-sized or large-sized battery pack, a large number of battery modules are loaded, and thus the tray should have a large size as much. Also, in order to cover the battery modules disposed on the tray, the pack cover should also have a large size. For example, the tray may have a rectangular shape with a longer length compared with its width, and the pack cover may be made with a rectangular dome shape covering the tray. In addition, the rim of the tray and the rim of the pack cover may be put into contact with each other, and the overlapped rims may be bolted for coupling.

The pack cover may be manufactured by processing a relatively thin metal plate by means of deep-drawing. However, in this case, a spring back phenomenon in which the pack cover tends to restore its original state from its deformed state, may occur so that both sides of the pack cover are spread. Due to this characteristic of the pack cover, it is difficult to precisely match the rims of the pack cover and the tray.

For example, a number of assembling holes are present in the rims of the pack cover and the tray. To assemble the pack cover and the tray, the assembling holes of the pack cover and the tray should be aligned with each other, and then a bolt should be inserted into each assembling hole and tightened. However, due to the spring back phenomenon of the pack cover, the rims of both sides of the pack cover are pushed out of both side rims of the tray from the step of placing the pack cover on the tray. In order to compensate for this, in the conventional technique, a tool is inserted into the assembling holes and the rims at both sides of the pack cover are pulled toward the inside of the tray to correct the position.

This additional compensation process of correcting the position of the pack cover may increase the tact time in the assembling process. Further, if the position is not smoothly corrected, not only the assembling holes of the pack cover and the tray but also assembling holes of the vehicle are misaligned and hidden.

DISCLOSURE

Technical Problem

The present disclosure is designed to solve the problems of the related art, and therefore the present disclosure is directed to providing a battery pack which may be assembled while matching assembling holes to the correct positions by preventing a pack cover from spreading when a tray and a pack cover of a battery pack casing are assembled.

However, the technical problem to be solved by the present disclosure is not limited to the above, and other objects not mentioned herein will be understood from the following description by those skilled in the art.

Technical Solution

In one aspect of the present disclosure, there is provided a battery pack, comprising: at least one battery module and electric parts electrically connected to the at least one battery module; a tray configured to support the at least one battery module and the electric parts at an upper surface thereof; and a pack cover having a rim that faces a rim of the tray, the pack cover being coupled to the tray to cover the battery module and the electric parts, wherein the tray includes a tray stopper provided at the rim of the tray and bent upwards to support the rim of the pack cover from an outer side toward an inner side.

The tray may include a base plate having a length extending longer than a width thereof and at least one outer wall plate disposed to stand up with respect to the base plate to form a wall, and at least one tray stopper may be provided to each of both rims of the base plate in a length direction of the tray.

The base plate may have a width corresponding to a width of one battery module, and battery modules may be disposed along the length direction of the base plate in a row.

The outer wall plate may include a front outer wall plate and a rear outer wall plate respectively provided to a front end and a rear end of the base plate, and the pack cover may include a cover body having length and width corresponding to the base plate and bent in both directions to have a convex center portion.

The cover body may have a step provided at a top end thereof and extending along the length direction of the tray.

The tray stopper may be bent to surround a part of the rim of the pack cover from an outer side toward an inner side.

The tray stopper may further include a protrusion protruding downwards at a top surface thereof to compress an upper surface of an end line of the pack cover.

Assembling holes may be formed in the rim of the tray and the rim of the pack cover in one-to-one relationship.

The battery pack may further comprise a sealing gasket disposed between the rim of the tray and the rim of the pack cover.

The sealing gasket may have perforating holes corresponding to the assembling holes.

In another aspect of the present disclosure, there may be also provided a vehicle, comprising the battery pack described above.

Advantageous Effects

According to an embodiment of the present disclosure, the assembling holes may be matched to correct positions by preventing the pack cover from spreading when the tray and the pack cover are assembled, thereby improving the efficiency of the assembling process compared to the existing technique.

According to another embodiment of the present disclosure, it is possible to provide a slim battery pack suitable for a vehicle with a limited space.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

The embodiments of the present disclosure are provided to more fully describe the present disclosure to those skilled in the art, and the shape and size of components in the figures may be exaggerated, omitted or schematically illustrated for better understanding. Thus, the size or ratio of components does not entirely reflect an actual size or ratio.

Figure 1:
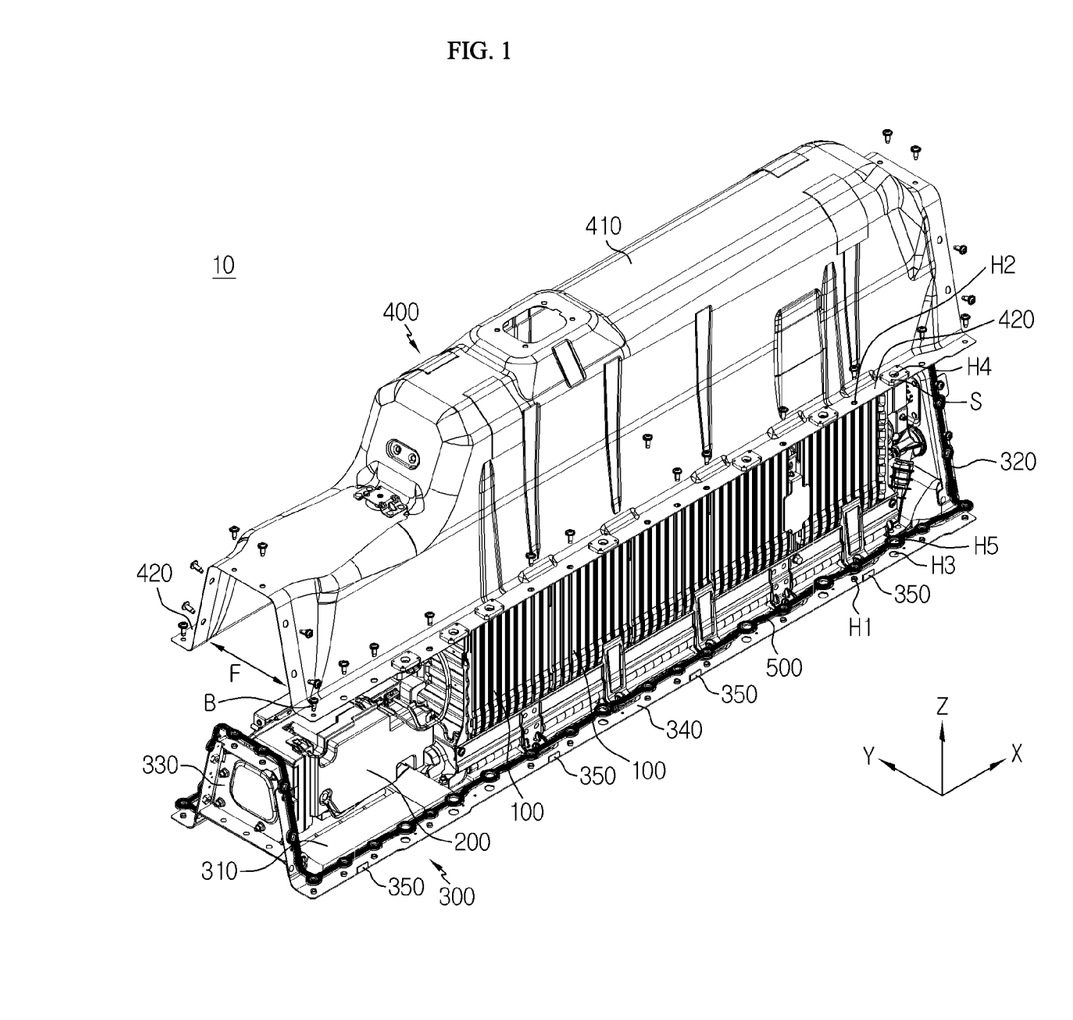
FIG. 1 is a partially exploded perspective view showing a battery pack according to an embodiment of the present disclosure.
Figure 2:
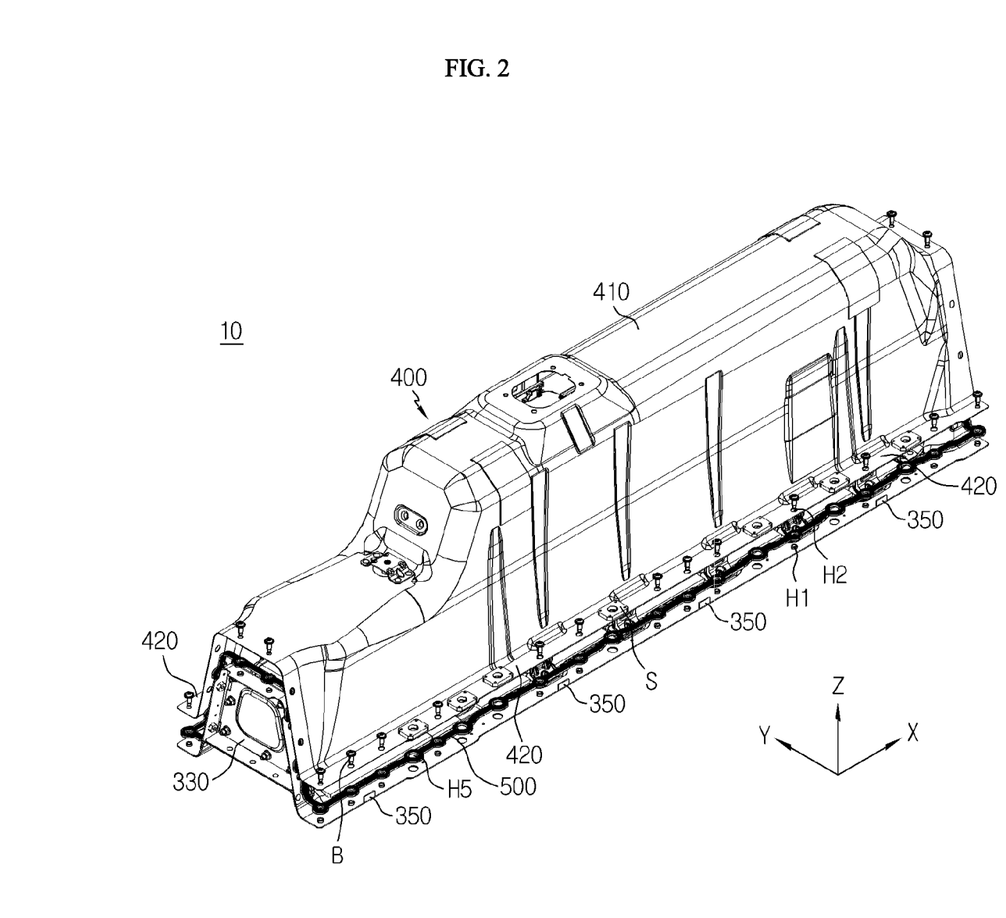
FIGS. 2 and 3 are perspective views showing a pack cover and a tray of FIG. 1 before and after being assembled.
Figure 3:
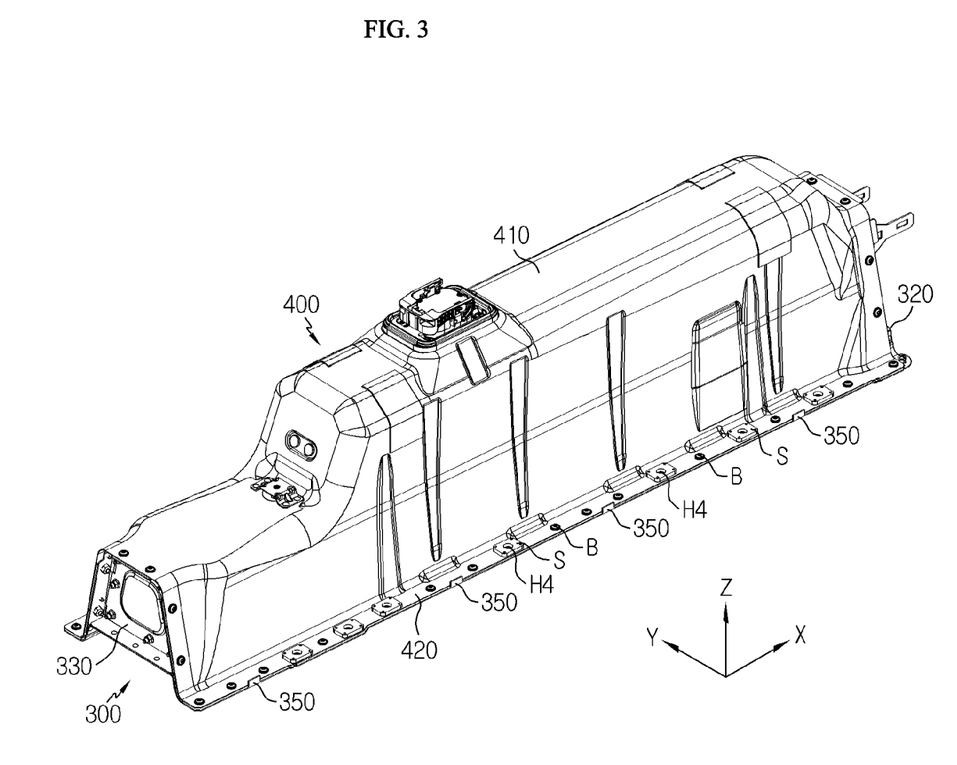

FIG. 1 is a partially exploded perspective view showing a battery pack according to an embodiment of the present disclosure, and FIGS. 2 and 3 are perspective views showing a pack cover and a tray of FIG. 1 before and after being assembled.

Referring to FIGS. 1 to 3, a battery pack 10 according to an embodiment of the present disclosure may include at least one battery module 100, electric parts 200 required for operating the battery module 100, and a tray 300 and a pack cover 400 for packaging the above components.

First, the battery module 100 and the electric parts 200 will be briefly described. The battery module 100 may be a group of a plurality of secondary batteries. Here, the plurality of secondary batteries may be pouch-type secondary batteries. In this case, the pouch-type secondary batteries may be stacked in one direction, for example in a vertical direction or in a lateral direction. The battery module 100 may further include a stacking frame for stacking the pouch-type secondary batteries. The stacking frame is a component used to stack secondary batteries and holds the secondary batteries not to move. A plurality of stacking frames may be stacked one another to guide assembling of the secondary batteries. The stacking frame may also be called using other terms such as a cartridge and may have a rectangular ring shape with an empty central portion. In this case, four corners of the stacking frame may be located on an outer periphery of the pouch-type secondary battery, respectively.

As shown in FIG. 1, the battery modules 100 are electrically connected to each other by a bus bar or the like and may be arranged on the upper surface of the tray 300 in a row along an X-axis direction. The capacity and output of the battery pack 10 may be changed as much as possible by connecting battery modules 100 in series and/or in parallel.

Electric parts 200 such as a relay assembly, a battery management system (BMS) assembly and a manual service disconnector (MSD) assembly may be disposed on left, right and upper sides of the stacked battery modules 100.

The relay assembly may be a switching component for selectively opening and closing a charging/discharging path through which a current flows. When an abnormal situation occurs at the battery pack 10, the relay assembly may cut off the charging/discharging current. The BMS assembly refers to a battery management device that controls overall charging/discharging operations of the battery modules 100, and may be a component typically included in the battery pack 10. In addition, the MSD assembly is a system for selectively cutting off the power supply of a high voltage battery in a physical way. For example, in this embodiment, the MSD assembly is provided at the top end of the pack cover 400, and if a service plug is separated as needed, the power supply may be cut off.

The battery pack 10 may further include other components, such as a cooling device for appropriately managing the temperature of the battery module 100, for example a heat sink, a cooling tube, a cooling water duct, and the like, in addition to the assembly of the battery modules 100 and the electric parts 200 required for operating the assembly of the battery modules 100.

The assembly of the battery modules 100 and other electric parts 200 may be fixedly coupled to each other or to the upper surface and the outer wall plates 320, 330 of the tray 300 by bolts or hooks and may be packaged by being covered with the pack cover 400.

The tray 300 and the pack cover 400 are components for giving mechanical support for the assembly of the battery modules 100 and other electric parts 200 and protecting them from external impacts. The tray 300 and the pack cover 400 may be made of metal such as steel to ensure rigidity.

The tray 300 may include a base plate 310 giving a generally flat and wide surface and outer wall plates 320, 330 disposed perpendicularly to the base plate 310. In addition, the base plate 310 may include a tray stopper 350 bent upward. Also, the pack cover 400 may include a cover body 410 with a depth sufficient to cover the assembly of the battery module 100 and other electric parts 200 and a rim 420 of the pack cover forming an outer periphery of the cover body 410.

In this configuration, the assembly of the battery modules 100 and other electric parts 200 may be disposed on the upper surface of the tray 300 and shielded by being covered with the pack cover 400.

As shown in FIGS. 1 to 3, the cover body 410 of the pack cover 400 has a length and a width corresponding to the base plate 310 and may have a structure with a convex center portion by bending a metal plate in a Y-axis direction.

In particular, the cover body 410 may protrude differently depending on the height of the battery modules 100 and the electric parts 200 disposed on the upper surface of the tray 300. In other words, the top end of the cover body 410 may have a step along the length direction (the X-axis direction) of the tray 300. In this case, there is no unnecessary dead space inside the battery pack 10, so that the battery pack 10 of the present disclosure may be as slim as possible in the vertical direction.

The rim 420 of the pack cover is a portion forming an outer periphery of the cover body 410. The rims 420 at both right and left sides of the pack cover in the length direction (the X-axis direction) may be bent with respect to the cover body 410 to face the rim 340 of the base plate 310, and the rims at front and rear sides of the pack cover 400 may be provided with a shape substantially identical to the peripheries of the outer wall plates 320, 330 to face the outer wall plates 320, 330. Thus, the rim 340 of the tray and the rim 420 of the pack cover may face each other as a whole. In this configuration, the tray 300 and the pack cover 400 may be disposed so that the rim 340 of the tray and the rim 420 of the pack cover face each other as a whole, and then integrally coupled to each other by bolts B.

In addition, a sealing gasket 500 may be further interposed between the rim 340 of the tray and the rim 420 of the pack cover. The sealing gasket 500 may prevent moisture and foreign substances from penetrating into the battery pack 10.

The sealing gasket 500 may have perforating holes H5 corresponding to the assembling holes H1, H2, H3, H4. Thus, the sealing gasket 500 may be firmly mounted between the rim 340 of the tray and the rim 420 of the pack cover by fastening a bolt through the assembling holes H2, H4 of the pack cover, the perforating hole H5 of the sealing gasket 500, and the assembling holes H1, H3 of the tray 300 in order. Accordingly, the watertightness between the tray 300 and the pack cover 400 may be enhanced. For reference, the bolt may be connected to a nut below the assembling holes H1, H3 of the tray 300 in order to improve the coupling stability.

Figure 4:
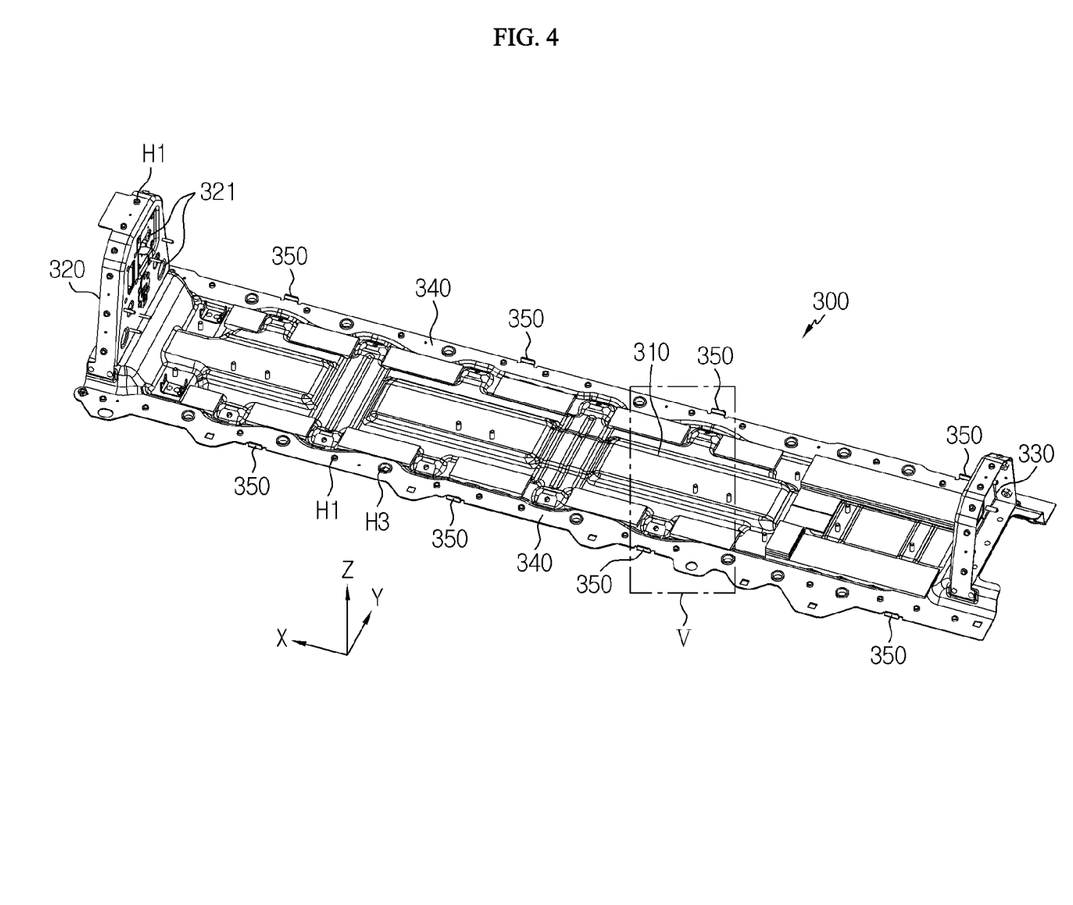
FIG. 4 is a perspective view showing the tray according to an embodiment of the present disclosure.

FIG. 4 is a perspective view showing the tray according to an embodiment of the present disclosure.

As shown in FIG. 4, the base plate 310 of this embodiment may have a longer length compared to its width. The width of the base plate 310 may correspond to the width of one battery module 100. Here, the length direction may be defined as the X-axis direction of FIG. 4, and the width direction may be defined as of the Y-axis direction of FIG. 4.

More specifically, the width of the base plate 310 except for both rims 340 may be substantially identical to the width of battery module 100. The battery pack 10 of the present disclosure may be configured so that the battery modules 100 and other electric parts 200 are arranged in a row on the upper surface of the base plate 310 as shown in FIG. 1. Thus, the battery pack 10 of the present disclosure may be designed slimly in the width direction, compared to the existing battery packs 10 having the same capacity.

This battery pack 10 may be spatially intensively mounted to a lower body of a vehicle. In other words, when the battery pack 10 is mounted to the vehicle, the vehicle has less space limitation in its length direction, compared to the width direction, due to the structure of the lower vehicle body. Thus, if the battery pack 10 is designed to have small width and height and have an elongated length instead, the battery pack 10 may be disposed to avoid interference with other devices or parts of the vehicle while maintaining its capacity.

The rim 340 of the base plate has the assembling holes H1, H3 formed therethrough in the vertical direction. The assembling holes H2, H4 are also provided in the rim 420 of the pack cover with the same pattern as shown in FIGS. 1 to 3. That is, the assembling holes H1, H2, H3, H4 provided in the rim 340 of the base plate and rim 420 of the pack cover may correspond to each other in a one-to-one relationship when the battery pack 10 is assembled.

The assembling holes H1, H2, H3, H4 may include tray/pack cover assembling holes H1, H2 and vehicle assembling holes H3, H4. For example, tray/pack cover assembling holes H1, H2 are used for bolting when the tray 300 and the pack cover 400 are assembled, and the vehicle assembling holes H3, H4 are used for bolting when the battery pack 10 is assembled to a vehicle body. When the battery pack 10 is assembled to the vehicle body, it is necessary to use a bolt or bushing having a relatively large diameter in order to secure the coupling stability between the battery pack 10 and the vehicle body. Thus, the vehicle assembling hole has a relatively larger diameter than the tray/pack cover assembling hole, and a spacer S may be further provided above the vehicle assembling hole H4 of the pack cover in order to prevent the tray 300 and the pack cover 400 from being damaged when the bolt is fastened.

The outer wall plates 320, 330 may be structures or brackets that stand upright with respect to the base plate 310 and forms walls of the tray 300. A plurality of outer wall plates 320, 330 may be provided, and each outer wall plate 320, 330 may be fabricated to be bolted or welded at a predetermined location of the base plate 310, for example at a front end and a rear end of the base plate 310 or at the upper surface of the base plate 310 positioned between the assembly of the battery modules 100 and the electric parts 200.

In this embodiment, the outer wall plates 320, 330 may include a front outer wall plate 320 and a rear outer wall plate 330. The front outer wall plate 320 and the rear outer wall plate 330 may be positioned at the front end and the rear end of the base plate 310, namely both side ends of the base plate 310 in the length direction, respectively.

The front outer wall plate 320 and the rear outer wall plate 330 support the assembly of the battery modules 100 and the electric parts 200 at the front and back surfaces of the assembly of the battery modules 100 and the electric parts 200, respectively. In addition, the peripheries of the front outer wall plate 320 and the rear outer wall plate 330 may be bolted to the rims at the front and rear sides of the pack cover 400. Accordingly, the front and rear sides of the battery pack 10 may be shielded. Here, the peripheries of the front outer wall plate 320 and the rear outer wall plate 330 may be defined as front and rear rims 340 of the tray 300.

In particular, the front outer wall plate 320 may have through holes 321 of various sizes. Although not shown in the figures, a connector for electrical connection with the vehicle, a cooling port for supplying cooling water, a venting plug for air ventilation and the like may be exposed or extended out of the battery pack 10 through the through holes.

Figure 5:
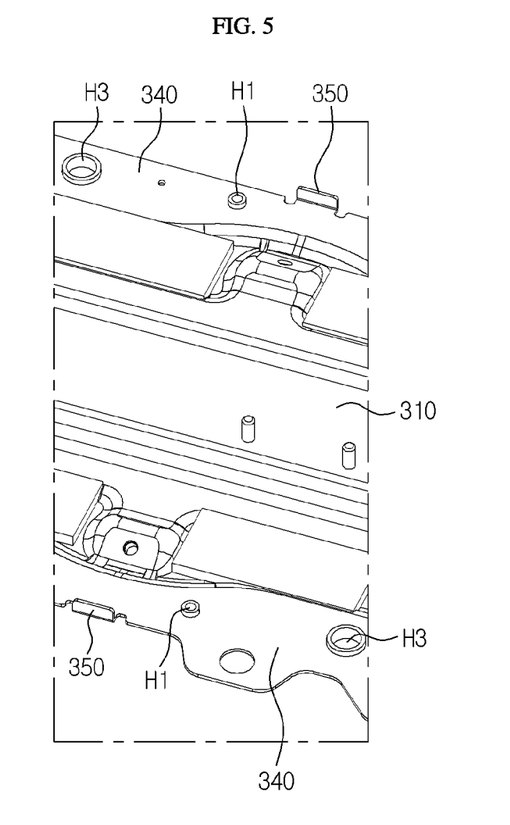
FIG. 5 is an enlarged view showing a portion V of FIG. 4.
Figure 6:
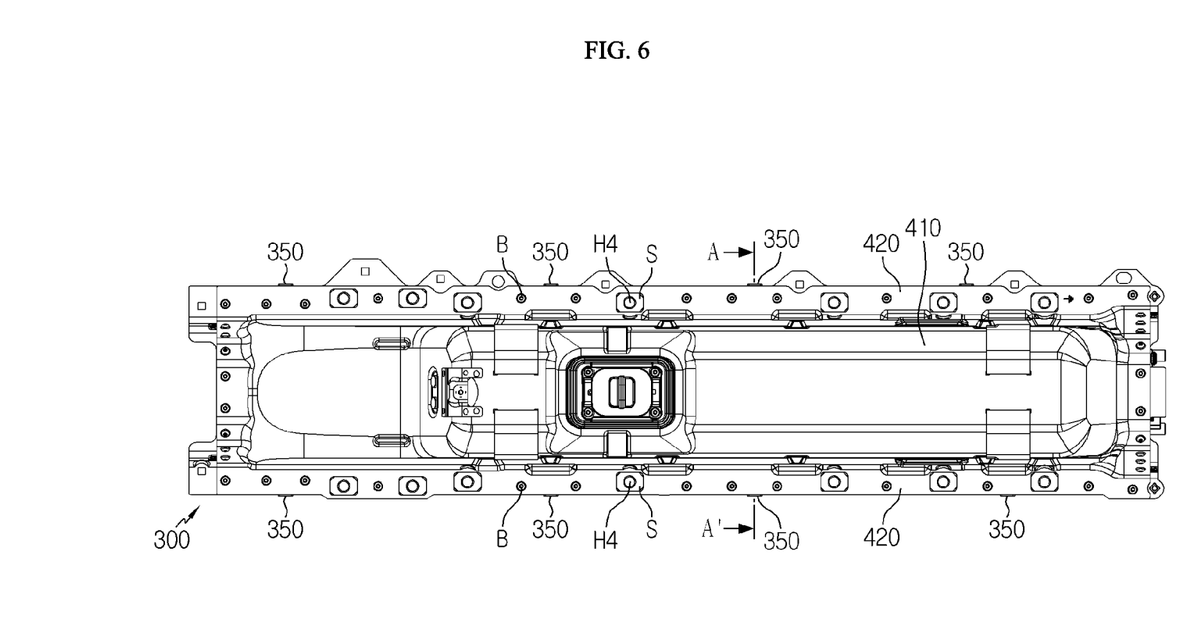
FIG. 6 is a plane view of FIG. 3.
Figure 7:
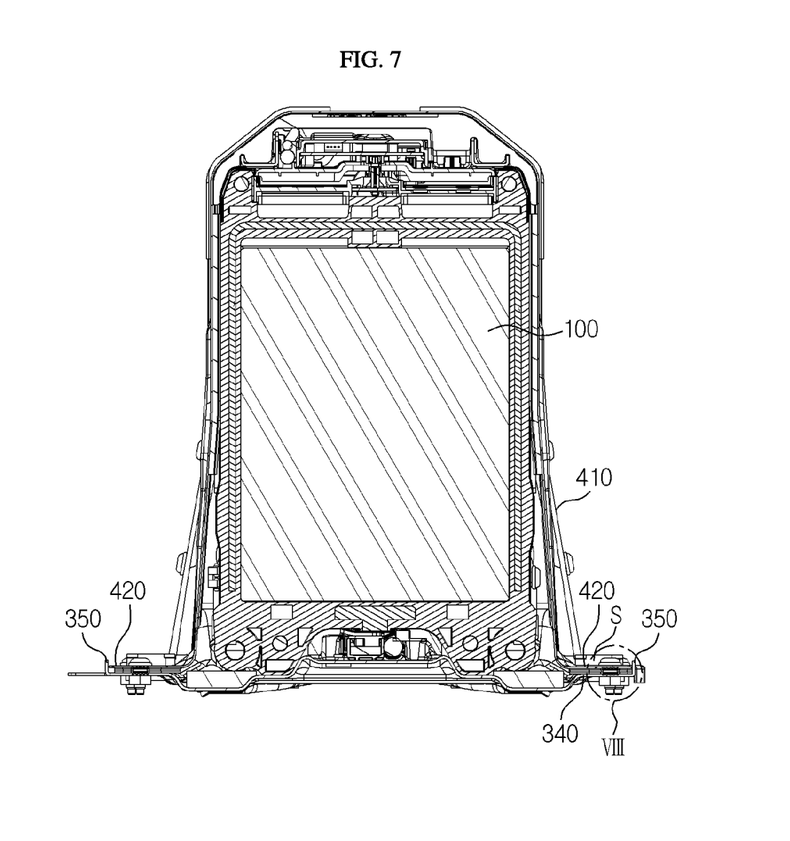
FIG. 7 is a cross-sectioned view, taken along the line A-A' of FIG. 6.
Figure 8:
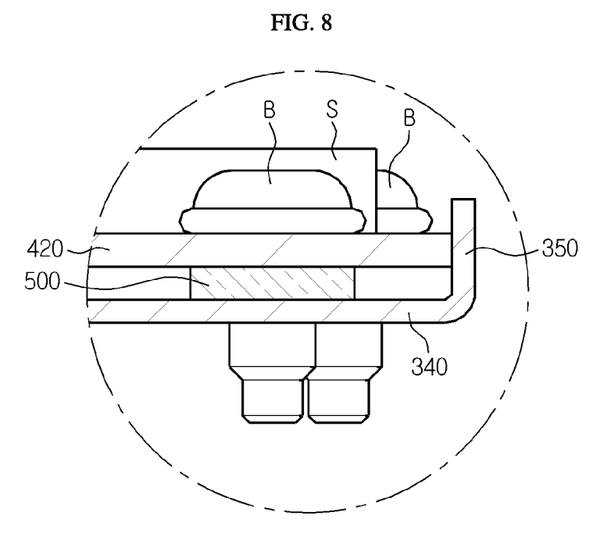
FIG. 8 is an enlarged view showing a portion VIII of FIG. 7.

FIG. 5 is an enlarged view showing a portion V of FIG. 4, FIG. 6 is a plane view of FIG. 3, FIG. 7 is a cross-sectioned view, taken along the line A-A' of FIG. 6, and FIG. 8 is an enlarged view showing a portion VIII of FIG. 7.

As shown in FIGS. 4 and 5, the tray stopper 350 is configured to bend upward from the rim 340 of the tray and plays a role of supporting the rim 420 of the pack cover from the outer side to the inner side when the pack cover 400 and the tray 300 are assembled.

The cover body 410 of this embodiment is curved in both directions (±Y-axis direction) as described above to have a convex center portion. For example, the cover body 410 may be formed in a deep drawing method. Due to the nature of the deep drawing method, the cover body 410 (see F in FIG. 1) is prone to exhibit the spring back phenomenon to restore to a state before the deep drawing. Thus, after the pack cover 400 is placed on the tray 300, before being bolted, the rims 420 at both sides of the pack cover may be spread outwardly further relative to the rims 340 of the tray, and thus the rims 420 at both sides of the pack cover may not face the rims at both sides of the tray 300 exactly. In this case, the assembling holes H1, H3 of the tray and the assembling holes H2, H4 of the pack cover may not communicate with each other in the vertical direction.

The tray stopper 350 prevents the spring back of the pack cover 400, which may cause a problem during the assembling process of the pack cover 400 and the tray 300. The tray stopper 350 of this embodiment may be provided to be bent upward at both side rims of the base plate 310. For example, the tray stopper 350 may be bent at approximately 90 degrees with respect to the base plate 310. In this embodiment, the tray stopper 350 is integrally formed with the base plate 310, but in an alternative embodiment, the tray stopper 350 may be implemented as a clamp or a bracket with an "L" shape, separately from the base plate 310.

In addition, a plurality of tray stoppers 350 may be provided to the rims at both sides of the base plate at preset intervals along the length direction of the tray 300. In this embodiment, eight tray stoppers 350 are provided in total as shown in FIG. 4, namely four tray stoppers 350 at each of both sides of the base plate 310. Unlike this embodiment, the number of the tray stoppers 350 may be more than or less than 10, and the tray stopper 350 may also be provided by bending the entire rims 340 at both sides of the base plate.

In the above configuration of the tray stopper 350, when the pack cover 400 is loaded on the tray 300, as shown in FIGS. 6 to 8, the rims 420 at both sides of the pack cover may be supported from the outside to the inside by the tray stopper 350. Accordingly, the spring back of the pack cover 400 is prevented, and thus the rims 420 of the pack cover may exactly face the rims 340 of the tray so that the assembling holes H1, H2, H3, H4 of the tray 300 and the pack cover 400 are aligned with each other. In this case, before the bolt B is fastened to the pack cover 400 and the tray 300, it is not needed for a worker to insert a separate tool into assembling holes H1, H2, H3, H4 of the pack cover 400 and the tray 300 and pulls the tool to correct locations.

In other words, when the pack cover 400 and the tray 300 are assembled, it is almost unnecessary to correct the location of the pack cover 400 to align the assembling holes H1, H2, H3, H4 of the pack cover 400 and the tray 300, and thus the tack time required for the assembling process may be reduced as much.

Figure 9:
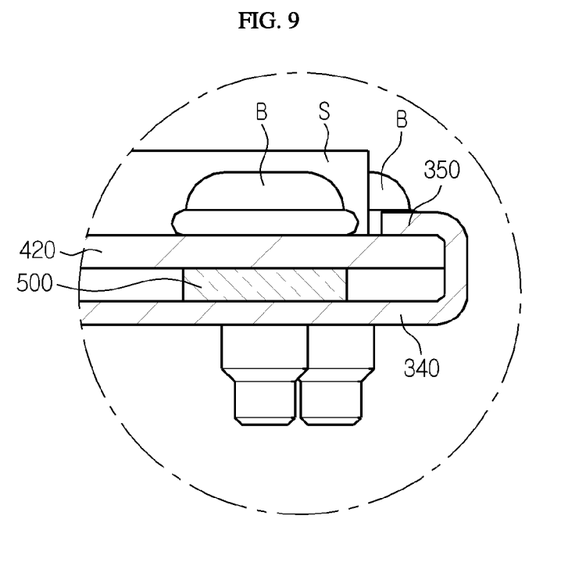
FIG. 9 is a diagram showing another embodiment of the tray stopper depicted in FIG. 8.
Figure 10:
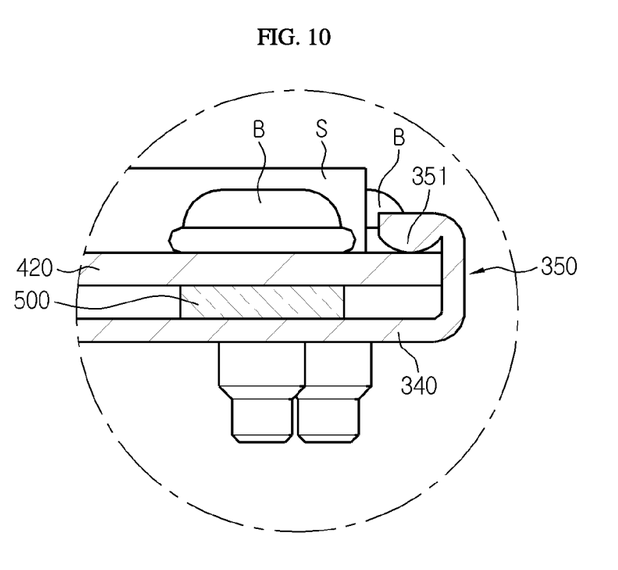
FIG. 10 is a diagram showing still another embodiment of the tray stopper depicted in FIG. 8.

FIG. 9 is a diagram showing another embodiment of the tray stopper depicted in FIG. 8, and FIG. 10 is a diagram showing still another embodiment of the tray stopper depicted in FIG. 8.

Other embodiments of the present disclosure, which will be described below, may be regarded as corresponding to FIG. 8, compared with the former embodiments. Like reference numerals denote like components, and the same component is not explained in detail again.

The tray stopper 350 of this embodiment may be bent to surround a portion of the rim 420 of the pack cover from the outside to the inside, as shown in FIG. 9. In this embodiment, the pack cover 400 may be loaded to the tray 300 by firstly inserting an end of any one of the rims 420 at both sides of the pack cover into the corresponding tray stopper 350 and then inserting the other of the rims 420 at both sides of the pack cover into the corresponding tray stopper 350. In this configuration, it is possible to prevent the pack cover 400 from spreading and vertically moving, even before being bolted, as compared with the former embodiments.

In addition, the tray stopper 350 according to the embodiment of FIG. 10 may further include a protrusion 351 protruding downward at the top end of the tray stopper 350 depicted in FIG. 9. The protrusion 351 may have an approximately hemispherical shape. In this configuration, the contact between the protrusion 351 and the upper surface of the rim 420 of the pack cover may be more tightened, compared to the tray stopper 350 depicted in FIG. 9, and thus the upper surface of the rim 420 of the pack cover may be more effectively pressed by the protrusion 351. Thus, the position of the pack cover 400 may be more securely fixed with respect to the tray 300.

The battery pack 10 of the present disclosure as described above may be applied to a vehicle such as an electric vehicle or a hybrid electric vehicle. In other words, the vehicle according to the present disclosure may include the battery pack 10 of the present disclosure.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, even though the terms indicating directions such as up, down, left, right, front and rear directions are used in the specification, it is obvious to those skilled in the art that these merely represent relative locations for convenience in explanation and may vary based on a location of an observer or an object.

INDUSTRIAL APPLICABILITY

The present disclosure relates to a battery pack with a tray stopper for preventing spring-back of a pack cover and is particularly applicable to industries using secondary batteries.

What is claimed is:

1. A battery pack, comprising:
a battery module and electric parts electrically connected to the battery module;
a tray configured to support the battery module and the electric parts at an upper surface thereof; and
a pack cover having a rim that faces a rim of the tray, the pack cover being coupled to the tray to cover the battery module and the electric parts,
wherein the pack cover includes a cover body with a depth sufficient to cover the battery module and the electric parts,
wherein the rim of the pack cover forms an outer periphery of the cover body,
wherein the tray includes a tray stopper provided at the rim of the tray and bent upwards to support the rim of the pack cover, and
wherein the tray stopper is configured to be at an outermost edge of the rim of the pack cover.

2. The battery pack according to claim 1,
wherein the tray includes a base plate having a length extending longer than a width thereof and at least one outer wall plate disposed to stand up with respect to the base plate to form a wall,
wherein the rim of the tray is at opposite sides of the tray in a width direction of the tray, and
wherein the tray stopper is provided to the rim of the tray at both the opposite sides of the tray.

3. The battery pack according to claim 2,
wherein the base plate has a width corresponding to a width of the battery module, and a plurality of the battery modules are disposed in a row along a length direction of the base plate.

4. The battery pack according to claim 2,
wherein the at least one outer wall plate includes a front outer wall plate and a rear outer wall plate respectively provided to a front end and a rear end of the base plate, and
wherein the pack cover includes the cover body having a length and a width corresponding to the base plate and bent downward at two sides to have a convex center portion.

5. The battery pack according to claim 4,
wherein the cover body has a step provided at a top end thereof and extending along the length direction of the tray.

6. The battery pack according to claim 1,
wherein the tray stopper is bent to surround a top of the rim of the pack cover and the outermost edge of the rim of the pack cover.

7. The battery pack according to claim 6,
wherein the tray stopper further includes a protrusion protruding downwards at a top surface thereof to compress an upper surface of an end line of the pack cover.

8. The battery pack according to claim 1,
wherein assembling holes are formed in the rim of the tray and the rim of the pack cover in one-to-one relationship.

9. The battery pack according to claim 8, further comprising:
a sealing gasket disposed between the rim of the tray and the rim of the pack cover.

10. The battery pack according to claim 9,
wherein the sealing gasket has perforating holes corresponding to the assembling holes.

11. A vehicle, comprising the battery pack defined in claim 1.

* * * * *